United States Patent [19]
Ridgeway

[11] Patent Number: 5,569,375
[45] Date of Patent: Oct. 29, 1996

[54] APPARATUS FOR FILTERING LIQUIDS IN A CLOSED SYSTEM

[76] Inventor: Kent Ridgeway, 8617 W. Cavalier Dr., Glendale, Ariz. 85305

[21] Appl. No.: 391,774

[22] Filed: Feb. 21, 1995

[51] Int. Cl.⁶ .............................................. B01D 35/027
[52] U.S. Cl. ........................... 210/137; 141/59; 141/286; 210/416.1; 210/472; 417/313
[58] Field of Search ..................................... 210/137, 459, 210/416.1, 97, 188, 472; 141/51, 59, 67, 285, 286, 290, 301; 417/313

[56] References Cited

U.S. PATENT DOCUMENTS

| | | | |
|---|---|---|---|
| 4,618,425 | 10/1986 | Yates | 210/416.1 |
| 4,690,621 | 9/1987 | Swain | 210/416.1 |
| 4,915,597 | 4/1990 | Moore | 210/416.1 |
| 5,115,842 | 5/1992 | Crafts et al. | 141/286 |
| 5,167,837 | 12/1992 | Snodgrass et al. | 210/416.1 |
| 5,262,068 | 11/1993 | Bowers et al. | 210/416.1 |

*Primary Examiner*—Joseph W. Drodge
*Attorney, Agent, or Firm*—Joseph H. Roediger

[57] ABSTRACT

A closed filtration system for transporting a liquid from a first container through a filter to a second container by the injection of gas under pressure into the first container. The container's filter and fluid conduit are attached to a common housing. The housing is provided with gas and liquid channels for each container. Ingress and egress tubes extend from the channels into the containers to permit the transfer of liquid from the first container to the second container.

11 Claims, 1 Drawing Sheet

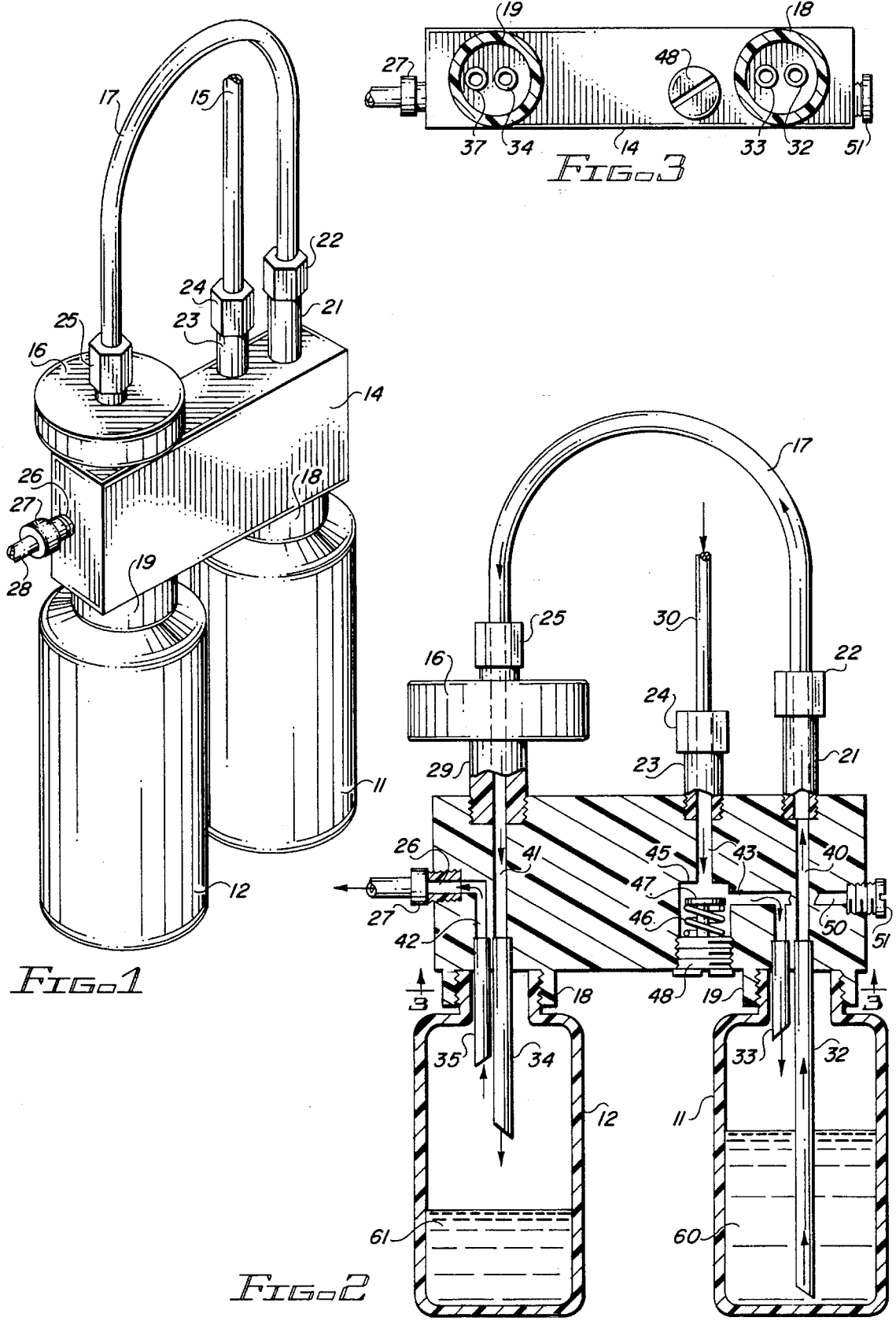

APPARATUS FOR FILTERING LIQUIDS IN A CLOSED SYSTEM

BACKGROUND OF THE INVENTION

This invention relates to novel apparatus for filtering liquids in a closed system wherein liquid is transferred between containers affixed to a housing with fluid transfer occurring through channels in the housing. The driving force for the fluid transfer is provided by a pressurized stream of inert gas.

In semiconductor manufacturing operations, product yield is determined in part by the cleanliness of the manufacturing environment and the purity of the raw materials used in the manufacturing operations. The environment is controlled by the manufacturer. The purity of the products is dependent on the care taken by the product provider in treating the products. The increasing expansion of capacity and the competitiveness in pricing now existing in the semiconductor manufacturing industry has created a great need for maintaining yields at a high level. To accomplish this goal, a need exists for efficiently providing solutions of all types which reliably conform to the specifications of the process being used. Among the types of treated solutions used are aqueous solutions, alcohols, ethyl acetate, acids and caustic liquids. The presence of particulate matter in these solutions directly impacts the manufacturing yield especially in connection with the manufacture of the semiconductor wafers. Any impurities left on the surface of semiconductor wafers at the start of processing generally manifest themselves as unacceptable integrated circuits which do not survive product testing. Since the effects of the impurities are not usually determinable until the manufacturing processes have been completed, the manufacturing yield drops for finished products.

In systems used for the removal of particulate matter from solutions, it is important to utilize inert material in the filtration system and containers. At present, stainless steel equipment is used in combination with polyetrafluraethylene (Teflon) coatings. These laminated and coated parts are expensive to manufacture and do not fully solve the problem since Teflon has a tendency to delaminate during use. One result of the delamination of system components is that iron, boron and nickel are leached from the stainless steel and serve as contaminants of the processed solutions. Frequently, the filtration systems used to separate out particulate matter from treatment solutions are located in a clean room due to the filtration system not being a closed system. The costs associated with the utilization of a clean room are substantial and contribute to the costs of the products being processed.

Accordingly, the present invention is directed to a closed system for the filtration of particulate matter from liquids which utilizes low cost, inert materials in a unitary structure which conducts filtration without exposure to the surrounding environment. The filtration system provides ready access to containers for the liquid being treated as well as to a disposable filter in fluid communication with the containers. In addition, the present provides a light weight, compact and easily transportable housing which is affixed to containing fluid transfer channels therein and adjacent liquid containers. The housing is coupled to a pressurized source of inert gas which provides the driving force for the liquid transferred between adjacent containers. A disposable filter included in the fluid flow path is affixed to the housing to complete the unitary structure.

SUMMARY OF THE INVENTION

The present invention is directed to a closed system for filtering a liquid during transfer from a first to a second container wherein a housing has a pair of spaced fluid transfer channels extending between the top and bottom surfaces of the housing.

First and second containers are affixed to the housing by coupling means located on the bottom surface of the housing at the termination of the fluid transfer channels. A pressure channel is formed in the housing and extends between the first coupler and a pressure channel connector positioned on the top surface of the housing. The connector is coupled to an external fluid reservoir, typically a cylinder, containing an inert gas under controlled pressure. A fluid transfer conduit communicates with the fluid transfer channels at the top surface of the housing and includes a fluid filter in the flow path. The fluid transfer conduit is linked to the transfer channels at the top surface of the housing by a pair of connectors. The housing is also provided with an output channel which extends internally from the second coupler to a vent port located on the surface of the housing.

In operation, the fluid in the first container is transferred to the second container through the fluid transfer conduit and filter to remove particulate matter. The driving force for effecting the fluid transfer from the first to the second container is provided by the pressurized gas flowing into the first container through the pressure channel. The fluid in the second container is expelled therefrom through the output channel and vent port of the housing.

The housing is a unitary structure with spaced first and second couplers located on the bottom surface, each of which receives a respective fluid container removably affixed thereto. The containers can be utilized to provide support for the housing in an upright position. The fluid filter contained in the fluid transfer conduit is removably attached to the top surface of the housing. The filter is changed periodically in accordance with its specifications without requiring access to the housing. A check valve is located within the housing to establish a threshold level for the pressure of the fluid provided by the external reservoir. Adjustment means is provided at the surface of the housing to permit variation of the threshold as desired. Preferably, a 3–5 psi activation pressure insures that no liquid backs up into the inert gas line.

The housing is formed by machining a polyethylene, Delrin or Teflon, block to establish the fluid transfer channels, the pressure channel and the output channel which vents the second container. In addition, Teflon tubing is used for the fluid transfer conduit to interconnect the fluid transfer channels and fluid filter. The system is a closed system since the containers are affixed to the housing and the fluid being filtered passes through the channels in the block and the transfer conduit without exposure to the outside environment. Consequently, the system can be operated without requiring a clean room environment to obtain the advantages of its use. In addition, the present system essentially eliminates evaporation losses of the fluid being filtered.

Further features and advantages of the invention will become more readily apparent from the following description of a preferred embodiment when taken in conjunction with the accompanying drawings.

BRIEF DESCRIPTION OF THE DRAWINGS

FIG. 1 is a view in perspective of the preferred embodiment.

FIG. 2 is a side view in cross section of the embodiment of FIG. 1.

FIG. 3 is a bottom view of the embodiment of FIG. 1.

DESCRIPTION OF THE PREFERRED EMBODIMENT

Referring now to FIG. 1, the housing 14 is shown as a rectangular block having first and second threaded engaging means 18. 19 depending from the bottom surface thereof. The engaging means removably couple the first and second containers 11, 12 to the housing. As shown, the containers are positioned on the housing to engage a basal surface and support the overlying system during operation.

The top surface of housing 14 is shown having a filter 16 affixed thereto with fastener 25 receiving the flexible fluid transfer conduit 17. The opposing end of conduit 17 is secured to extension 21 by fastener 22 and is in general alignment with the container 11. Also located on the top surface of housing 14 is extension 23 provided with fastener 24 to receive a section of flexible tubing connected to an external reservoir of pressurized fluid, typically nitrogen. A vent port 26 is provided on an end surface of housing 14. The vent port is provided with an extension having fastener 27 thereon to receive a section of flexible tubing to disperse or transmit discharge fluid from second container 12.

The constructional features of the embodiment are shown more clearly in the cross sectional view of FIG. 2 wherein the first and second fluid transfer channels 40, 41 extend between the top and bottom surfaces of the housing and are in parallel alignment. The openings of the fluid transfer channels 40, 41 in the bottom surface of housing 14 are centrally located in couplers 18, 19 respectively. As shown, each of these couplers is provided with an internal thread to receive the first and second containers 11, 12. Fluid transfer channel 40 is provided with a downward tubular extension or egress tube 32 which extends proximate to the bottom of first container 11. Also, fluid transfer channel 41 is provided with downward extension or ingress tube 34 which is shown extending into the central region of second container 12.

The housing 14 also includes pressure channel 43 extending downwardly from the top surface of the housing and communicating with coupler 19. The pressure channel is provided with a short length downward extension or ingress tube 33. A lateral extension 50 of the pressure channel is shown extending to the side of housing 14 and is sealed by threaded plug 51. The lateral extension is primarily to facilitate manufacture although it assists in cleaning of the housing when needed. The pressure channel is provided with a valve seat 45 formed by a larger diameter collinear hole formed from the bottom surface of block 14. The shoulder forms the valve seat 45 for valve 47 which is movably attached to threaded insert 48. A biasing spring 46 is provided to urge valve 47 against valve seat 45 so that it is normally closed. The adjustment of insert 48 varies the biasing force that must be overcome by the pressure in tube 30 which is connected to an external reservoir containing compressed nitrogen gas (not shown). Tube 30 is affixed to threaded extension 23 by threaded fastener 24 as shown in FIG. 2. The rotation of insert 48 therefore determines the threshold level at which pressure applied from the external reservoir will overcome the biasing force of spring 46 to permit the entry of fluid into first container 11 via extension 33.

The first fluid transfer channel exits from the housing via extension 21 threadably attached to the top surface of the housing via fluid transfer conduit 17. The fluid transfer conduit 17 is in communication with the second fluid transfer channel 41 through fluid filter 16. The fluid filter is representative of commercially available disposable filters such as the Acro 50 mpt filter manufactured by Gelman. The filter 16 is provided with a threaded attachment 29 which inserts into the top surface of housing 14 to provide replacement as needed.

Conduit 17 is affixed to the filter by fastener 25 and to extender 21 by fastener 22. To complete the fluid circuit, output channel 42 is formed in second coupler 18 and extends through vent port 26 to evacuation tubing 28. Fastener 27 is provided at output vent port 26 to provide secure attachment for tubing 28. The output channel is provided with a downward tubular extension or ingress tube 35 which is relatively short when compared with the adjacent tubular extension 34 to enable the container to be substantially filled without causing liquid to flow out of the housing.

Since contamination of fluids during filtration processes occurs in part because of the leaching of various metals from presently employed filter systems, the housing 14, the extensions and fasteners as well as the tubing are made of polyethylene, an inert synthetic material such as Delrin or Teflon. The fluid passageways within the housing are machined into the housing block using conventional manufacturing techniques. The threaded couplers 18 and 19 may be machined into the housing and are shown in the bottom view of housing 14 in FIG. 3 with the first and second containers 18, 19 are removed. The tubular extensions are shown adjacently spaced in longitudinal alignment to correspond with the cross sectional view of FIG. 2. However, it is to be noted that other alignments can be utilized if desired. The structural advantages obtained by the use of a single block to provide a compact housing for the filter assembly and support for external attachments are considerable. The structure is a rugged unitary structure formed of inert low cost materials. In addition, the system is relatively light in weight and inexpensive to manufacture since the channel boring is perpendicular to the surface of the housing block. As shown, access to the disposable filter is readily available to facilitate change-out. The light weight of the structure enables the user to support the housing and attachments while withdrawing the containers.

In operation, first container 11 filled with the liquid, typically distilled water or alcohol, which is to be subjected to the filtration process is threaded onto the housing. The second container is in place. The pressure in tube 30 coupled to the external fluid reservoir, typically a nitrogen supply, is then increased through external control to urge the valve 47 away from seat 45. As a result, fluid flow into first container 11 is initiated in the direction of the arrows. The pressure urges the liquid 60 upwardly from container 11 into the fluid transfer channel 40 and through the fluid transfer conduit 17 to fluid filter 16. The fluid is processed within the filter 16 to remove particulate matter in accordance with the filter media contained therein and then travels through fluid transfer channel 41 and into second container 12. The filtered liquid 61 continues to flow into the second container as long as the pressure is maintained in tube 30 and liquid remains in first container 11. Venting of fluid from container 12 occurs through channel 42 and output port 26. At the completion of the cycle, the housing is grasped by the operator with one hand and the containers 11 and 12 removed from the couplers. The next cycle begins with the placement of fresh first and second containers in the position shown in FIGS. 1 and 2.

The embodiments successfully tested and operated have used containers of 4, 8, 16 and 32 ounce capacity. If larger containers are desired, additional support means for the housing during the changeover of containers might be necessary. While the efficacy of the filtration process is dependent upon the type of impurity and the particular replaceable filter 16 utilized, it is to be noted that the structure of the housing and the utilization of the different channels contained therein provide a closed system which essentially eliminates external contamination from adversely impacting the operation of the novel system. During operation of the present system, no evaporation losses of the fluid being treated were noted.

While the above description has referred to a preferred embodiment of the invention using nitrogen as the operating fluid, other gases and liquids may be used. Also, it is to be noted that many variations and modifications may be made in the embodiment shown without departing from the scope of the invention as claimed.

I claim:

1. A closed system for filtering a liquid during transfer from a first to a second container, said system comprising:
   a) a housing including a top surface and containing first and second fluid transfer channels therein;
   b) a fluid transfer conduit interconnecting said first and second fluid transfer channels;
   c) first and second engaging means formed in said housing for removably receiving first and second containers therein, each of said engaging means communicating with a corresponding one of said fluid transfer channels;
   d) pressure drive means, arranged for communicating with the first container, for conveying fluid to said first container and driving liquid therefrom;
   e) a first egress tube attached to the first and fluid transfer channel and arranged for extending into the first container;
   f) venting means, arranged for communicating with the second container, for conveying fluid therefrom;
   g) a first ingress tube attached to the second fluid transfer channel and arranged for extending into the second container and;
   h) a filter coupled to the fluid transfer conduit for removing impurities from liquid passing therethrough, activation of the pressure drive means urging liquid through the filter to the second container.

2. The invention in accordance with claim 1 wherein said pressure drive means includes a second ingress tube arranged for extending into the first container, the egress tube configured and arranged for extending beyond the second ingress tube.

3. The invention in accordance with claim 2 wherein said venting means comprises a vent passage formed in said housing and a second egress tube arranged for extending into the second container, the first ingress tube configured and arranged for extending beyond the second egress tube, said vent passage extending to outside said housing.

4. The invention in accordance with claim 3 wherein said pressure drive means is contained within the housing and includes a pressure responsive valve.

5. The invention in accordance with claim 4 further comprising a valve seat formed in the housing for receiving the pressure responsive valve in a normally closed position, said valve being urged from said closed position by the application of fluid at a pressure above a threshold level.

6. The invention in accordance with claim 5 further comprising means for providing an external adjustment of the threshold level, said means being located in the housing.

7. The invention in accordance with claim 6 wherein said fluid transfer conduit comprises flexible tubing removably attached to the top surface of said housing and to the filter.

8. Apparatus for filtering a liquid which comprises:
   a) a housing having top and bottom surfaces and containing two fluid transfer channels extending between said surfaces;
   b) first and second couplers affixed to the bottom surface of said housing for removably receiving first and second fluid containers therein, each of said couplers communicating with a corresponding one of said fluid transfer channels in the housing;
   c) an egress tube coupled to one of the fluid transfer channels and arranged for communicating with the first fluid container and extending therein proximate to the bottom of said container;
   d) a pressure channel formed in said housing and communicating with the first coupler;
   e) a pressure channel connector positioned on the top surface of the housing for connecting the pressure channel to an external fluid reservoir;
   f) an output channel formed in said housing and extending from the second coupler to a surface of said housing;
   g) a fluid transfer conduit communicating with the fluid transfer channels in said housing, and
   h) a fluid filter coupled to the fluid transfer conduit, application of a pressurized fluid to the pressure channel driving liquid from the first container through the filter to the second container.

9. The invention in accordance with claim 8 further comprising a valve located in the pressure channel, said valve opening upon the application of fluid having a pressure exceeding a threshold level.

10. The invention in accordance with claim 9 further comprising an adjustable positioning plug located in said housing for supporting the pressure valve, movement of the plug in the housing varying said threshold level.

11. The invention in accordance with claim 10 wherein said fluid filter is removably affixed to the top surface of the housing.

\* \* \* \* \*